(12) United States Patent
Hilton

(10) Patent No.: US 7,092,869 B2
(45) Date of Patent: Aug. 15, 2006

(54) MEMORY ADDRESS PREDICTION UNDER EMULATION

(76) Inventor: Ronald Hilton, 20861 Fargo Dr., San Francisco, CA (US) 95014

( * ) Notice: Subject to any disclaimer, the term of this patent is extended or adjusted under 35 U.S.C. 154(b) by 812 days.

(21) Appl. No.: 09/992,137

(22) Filed: Nov. 14, 2001

(65) Prior Publication Data

US 2003/0093776 A1 May 15, 2003

(51) Int. Cl.
    G06F 9/455 (2006.01)
(52) U.S. Cl. .......................... 703/26; 703/27; 717/134; 717/135; 717/138; 712/209
(58) Field of Classification Search ................. 703/26; 717/134, 135, 138
    See application file for complete search history.

(56) References Cited

U.S. PATENT DOCUMENTS

| 4,347,565 | A | * | 8/1982 | Kaneda et al. ................. 711/6 |
| 4,587,612 | A | | 5/1986 | Fisk et al. |
| 4,638,423 | A | * | 1/1987 | Ballard ........................ 703/26 |
| 4,791,558 | A | | 12/1988 | Chaitin et al. |
| 5,029,069 | A | * | 7/1991 | Sakamura ................... 712/234 |
| 5,301,302 | A | * | 4/1994 | Blackard et al. ............. 703/20 |
| 5,406,644 | A | | 4/1995 | MacGregor |
| 5,546,552 | A | * | 8/1996 | Coon et al. ................. 712/209 |
| 5,560,013 | A | * | 9/1996 | Scalzi et al. ................ 717/138 |
| 5,577,231 | A | * | 11/1996 | Scalzi et al. ................ 703/26 |
| 5,577,233 | A | * | 11/1996 | Goettelmann et al. ........ 703/26 |
| 5,680,568 | A | * | 10/1997 | Sakamura ................... 712/230 |
| 5,751,982 | A | * | 5/1998 | Morley ........................ 712/209 |
| 5,768,593 | A | * | 6/1998 | Walters et al. .............. 717/141 |
| 5,790,825 | A | * | 8/1998 | Traut .......................... 712/209 |
| 5,870,575 | A | * | 2/1999 | Kahle et al. ................. 712/209 |
| 5,933,622 | A | * | 8/1999 | Buzbee et al. ................ 703/22 |
| 6,009,261 | A | * | 12/1999 | Scalzi et al. ................. 703/26 |
| 6,075,937 | A | * | 6/2000 | Scalzi et al. ................. 703/23 |
| 6,142,682 | A | * | 11/2000 | Skogby ....................... 703/26 |
| 6,163,764 | A | * | 12/2000 | Dulong et al. ............... 703/26 |
| 6,243,668 | B1 | * | 6/2001 | Le et al. ...................... 703/27 |
| 6,397,242 | B1 | | 5/2002 | Devine |
| 6,457,117 | B1 | * | 9/2002 | Witt ........................... 712/227 |
| 6,516,295 | B1 | * | 2/2003 | Mann et al. .................. 703/26 |
| 6,704,925 | B1 | * | 3/2004 | Bugnion ...................... 703/26 |
| 6,973,417 | B1 | * | 12/2005 | Maxwell et al. ............... 703/2 |
| 2001/0047438 | A1 | * | 11/2001 | Forin .......................... 710/18 |

(Continued)

FOREIGN PATENT DOCUMENTS

GB   2203572   10/1998

OTHER PUBLICATIONS

"Instruction translation for an experimental S/390 processor";Rolf Hilgendorf, Wolfram Sauer ;Mar. 2001 ACM SIGARCH Computer Architecture News, vol. 29 Issue 1.*

(Continued)

Primary Examiner—Fred Ferris
Assistant Examiner—Akash Saxena
(74) Attorney, Agent, or Firm—David E. Lovejoy

(57) ABSTRACT

Emulation of a guest computer architecture on a host system of another computer architecture. Legacy instructions are translated into translated instructions. If the particular legacy instruction is an operand-setting instruction for storing a value of a precedent operand, a corresponding flag is set when the value of the precedent operand has not been determined. If the particular legacy instruction is an operand-using instruction for using the precedent operand, a check is made to determine if the corresponding flag is set.

21 Claims, 3 Drawing Sheets

U.S. PATENT DOCUMENTS

2003/0093649 A1* 5/2003 Hilton .................... 717/138
2003/0093774 A1* 5/2003 Hilton .................... 717/138
2003/0093775 A1* 5/2003 Hilton .................... 717/138
2004/0073892 A1* 4/2004 Fallah et al. ............. 717/135

OTHER PUBLICATIONS

"Binary translation and architecture convergence issues for IBM system/390";Michael Gschwind et al; May 2000; Proceedings of the 14th international conference on Supercomputing.*

Migrating a CISC computer family onto RISC via object code translation Kristy Andrews et al; Sep. 1992 ACM SIGPLAN Notices, ASPLOS-V, vol. 27 Issue 9□□.*

Binary translation and architecture convergence issues for IBM system/390; Michael Gschwind et al; May 2000 Proceedings of the 14th international conference on Supercomputing□□.*

Apiki, S., "Windows on RISC," Byte, Apr. 1994, pp. 109-115.

Bergh, A., Kielman, K., Magenheimer, D., and Miller, J., "HP3000 Emulation on HP Precision Architecture Computers," Hewlett-Packard Journal, Dec. 1987,, pp. 87-89.

Boyd-Merritt, R., "IBM, NCR Show Parallel Mainframes," Electronic Engineering Times, Nov. 15, 1993, pp. 16,138.

De Maine, P., and Leong, S., "Transportation of Programs," Abstract: "Proceedings of the Fifteenth Southeastern Symposium on System Theory, Mar. 1983, pp. 158-164.".

Halfhill, T., "Emulation: RISC's Secret Weapon," Byte, Apr. 1994, pp. 119-130.

Halfhill, T., "80×86 Wars," Byte, Jun. 1994, pp. 74-88.

May, C., "MIMIC: A Fast System/370 Simulator," SIGPLAN '87 Symposium on Interpreters and Interpretive Techniques, Jun. 1987, pp. 1-13.

Poole, L., "PowerPC Preview," Macworld, Feb. 1994, pp. 102-108.

Slater, M., "Windows NT: Putting the Squeeze on Intel," OEM Magazine, Jul. 1993, pp. 52-57,90.

Thelen, R., "The Power Mac's Run-Time Architecture," Byte, Apr. 1994, pp. 131-138.

Thompson, T., and Ryan, R., "Apple, IBM Bring PowerPC to the Desktop," Byte, Apr. 1994, pp. 44-72.

Timmins, L., "Techniques for Translating Object Code into a Reduced Microprocessor Architecture," Proceedings of IESMM International Symposium on Software and Hardware Applications of Microcomputers, Feb. 1986, pp. 181-184.

* cited by examiner

FIG. 3

LEGACY CODE (CISC)

```
100  START  BALR  B1,R0
102  BASE   LM    R1,R2,DATA1
106         MVC   DATA1, DATA3
10C         AH    R1,DATA2
110         SRA   R1,1
114         SH    R2,DATA2
118         AR    R1,R2
11A         BC    TARGET
120  DATA1  DC    X'005390BC'
            DC    X'09C20004'
128  DATA2  DC    X'0009'
12A  DATA3  DC    X'800039AF'
```

```
100  START  BALR  B1, R0
102  BASE   LM    R1, R2,DATA1
106         MVC   DATA1, DATA3
10C         AH    R1, DATA2
```

TRANSLATED CODE (RISC)

```
BALR  MOV  B1   BASE
LM    ADD  A1   B1,DATA1-BASE
      LD4  R1   [A1]
      ADD  A1   A1,4
      LD4  R2   [A1]
MVC   ADD  A1   B1,DATA1-BASE
      ADD  A2   B1,DATA3-BASE
      LD4  T1   [A2]
      ST4  T1   [A1]
AH    ADD  A1   B1,DATA2-BASE
      LD2  T1   [A1]
      ADD  R1   R1,T1
      B    XFER_SEQUENTIAL
```

```
110         SRA   R1,1
114         SH    R2,DATA2
118         AR    R1,R2
11A         BC    TARGET
120  DATA1  DC    X'005390BC'
            DC    X'09C20004'
128  DATA2  DC    X'0009'
12A  DATA3  DC    X'800039AF'
```

```
SRA   SHR  R1   1
SH    ADD  A1   B1,DATA2-BASE
      LD2  T1   [A1]
      SUB  R2   R2,T1
AR    ADD  R1   R1,R2
BC    ADD  A1   B1,TARGET-BASE
      B    XFER_BRANCH
```

MEMORY ADDRESS PREDICTION UNDER EMULATION

BACKGROUND OF THE INVENTION

The present invention relates to computer systems and particularly to emulation of one computer architecture (the "guest") via software on the hardware platform of another computer architecture (the "host").

In typical computer architectures, computer source code is compiled/assembled (at compile/assembly time) into executable object code. The executable object code is executed at execution time on the hardware under control of the operating system. In order for computer source code written for a native architecture to run as a "guest" on a different architecture called a "host" architecture, the host architecture employs an emulator. The emulator emulates the native architecture while actually executing as a guest on the host architecture.

Various methods have been employed for emulating a guest computer architecture via software on the hardware platform of a host computer architecture. The categories of emulation are static emulation or dynamic emulation. In static emulation, the emulation is performed prior to run-time and in dynamic emulation, the emulation is performed at run-time.

One type of static emulation system employs object code translation. The native object code that is compiled/assembled for a native system becomes the guest object code on a host system. The guest object code is translated in a manner that is similar to the way that original source code is compiled/assembled into the object code for the native system. In the emulation case, however, rather than starting with the original source code, the emulation starts with the previously compiled/assembled object code as prepared for the native system. The guest object code (the native object code on the host system) is passed through an emulator to form the translated object code. The translated object code is suitable for execution directly by the host system. Essentially, static emulation is a method of recompiling the native object code without using the original source code. The advantage of such static emulation is that the resulting translated object code can be optimized in much the same way that native object code is optimized when native object code is compiled/assembled from original source code. Unfortunately, it is not always possible to glean all the necessary information statically from the native object code alone that was available when the original source code was compiled/assembled from original source code.

Another method of static emulation is Application Programming Interface (API) mapping. This method of static emulation only applies to operating system code in which the API calls of the guest operating system are mapped to a host call or set of host calls that perform the equivalent function on the host system. The API mapping has a performance advantage since the host operating system software has been optimized for the host system. However, if the native and host systems are too dissimilar, then the desired mapping may not always be possible. Nevertheless, API mapping is a useful method for providing some degree of equivalent operating system functionality when used in conjunction with other forms of static or dynamic emulation.

Dynamic emulation is performed during run time. The main advantage of dynamic emulation is greater transparency to the user in that no pre-processing need be invoked by the user as is required for static emulation. A simple type of dynamic emulation uses an interpreter which fetches, parses, and decodes each guest instruction and responsively executes a routine to carry out the equivalent functions on the host system. The main disadvantage of an interpreter is one of low performance because of the significant overhead involved in processing every guest instruction each time it is executed. To mitigate the disadvantage of that overhead, a more advanced method of dynamic emulation sometimes called "JIT" (just-in-time) translation is employed.

In JIT dynamic emulation, the native object code is translated (similar to the static method), cached, and executed in piecemeal fashion, a small portion at a time. By translating only a small portion of guest object code that is likely to be executed next, the translation is performed in real time, essentially concurrently with the execution of the translated code. The translated code is cached (i.e. saved) to permit subsequent re-use without the need for re-translation. The initial translation overhead is therefore amortized over time, allowing the overall performance to approach that of static object code translation, especially within the most frequently used portions of the code. By using additional information regarding program behavior that can be gleaned at run-time, it is possible to optimize the translated code to obtain performance beyond that achievable with static translation alone.

Emulation frequently is used when a CISC architecture is emulated on a RISC architecture. A key difference between typical CISC and RISC architectures lies in the complexity of the memory access model that is supported. A defining characteristic of RISC architectures is the "load/store" memory model in which the only memory access primitives provided are simple aligned loads, stores, and atomic updates. By way of distinction, CISC architectures, such as S/390, support many more storage-referencing primitives of varying operand lengths with fewer restrictions on operand alignment. If the translated code resulting from translations from CISC architectures to RISC architectures fails to properly account for alignment variations existing in the CISC code, alignment faults occur upon execution of the translated code. The alignment fault processing during emulation is very costly in terms of wasted execution time.

One technique to guarantee avoidance of alignment faults is to use only 1-byte primitives so that proper byte boundary alignment always occurs for operands. Although using 1-byte primitives guarantees avoiding alignment faults in translated code, the use of only 1-byte primitives in translations is less efficient than necessary in most cases. The alternative, however, of always using larger primitives, such as 4-byte primitives, guarantees a large amount of wasted execution time required for processing alignment faults that necessarily occur with high frequency during execution of the translated code.

Some CISC instructions, such as the S/390 LM instruction, use byte-aligned operands which can be predictably translated in advance without creating a byte alignment problem in the translated code. Other CISC instructions, such as the S/390 MVC instruction, are unpredictable and use variable length operands which cannot be predictably translated in advance of execution of precedent instructions without creating a byte alignment problem in the translated code.

Instruction code for CISC architectures often employs indirect addressing where the actual address used for a particular CISC instruction is not determined until execution of a precedent CISC instruction executed just before that particular CISC instruction is executed. Translations of CISC instructions that occur before the execution of the precedent CISC instruction cannot know, for such CISC instructions, the byte size of the operands that result from execution of the precedent CISC instruction. Hence, the indirect addressing context used frequently in instruction code using CISC instructions presents the dilemma in connection with the translation of such CISC instructions of whether to use short primitives (such as 1-byte primitives) or long primitives (such as 4-byte primitives) in the translations of those CISC instructions. For such instructions, if short primitives are employed, then the translation is inefficient and if long primitives are employed, then execution of the translated code is inefficient. In either case the emulation is inefficient.

In order to take advantage of dynamic emulation, there is a need for improved dynamic emulators that help achieve the objectives of improved and more efficient computer system operation, particularly in the processing of variable length operands and other operations that create operand alignment problems.

SUMMARY

The present invention is for emulation of a guest computer architecture on a host system of another computer architecture. The guest computer architecture has programs composed of legacy instructions. To perform the emulation of the legacy instructions on the host system, the legacy instructions are accessed in the host system.

Each particular legacy instruction is translated into one or more particular translated instructions for emulating the particular legacy instruction. If the particular legacy instruction is an operand-setting instruction for storing a value of a precedent operand, a corresponding flag is set when the value of the precedent operand has not been determined. If the particular legacy instruction is an operand-using instruction for using the precedent operand, a check is made to determine if the corresponding flag is set. If the corresponding flag is set, translation of the operand-using instruction is suspended and the one or more particular translated instructions corresponding to the operand-setting instruction are executed to determine the value of the precedent operand. Thereafter, the translation of the legacy instructions is resumed using the value of the precedent operand in the resumed translation. If the corresponding flag is not set, the translation of the operand-using instruction continues without suspension.

In one embodiment, the suspending of the translation inserts a resume_translation call into a stream of the translated instructions in place of translations of the operand-using instruction. The execution of the one or more particular translated instructions continues until the resume_translation call is reached and then the translation resumes by translating the operand-using instruction.

In one specific embodiment, the particular legacy instruction is an unpredictable operand-using instruction having unpredictable byte alignment, for example, because the unpredictable operand-using instruction uses operands of variable length. If the particular legacy instruction is a predictable operand-using instruction, the checking is bypassed and the translation continues, for example, where the predictable operand-using instruction employs fixed-length operands.

In a typical embodiment, the legacy instructions are for a legacy system having a S/390 architecture and the legacy instructions are object code instructions compiled/assembled for the S/390 system and the translated instructions are for execution in a RISC architecture.

The foregoing and other objects, features and advantages of the invention will be apparent from the following detailed description in conjunction with the drawings.

BRIEF DESCRIPTION OF THE DRAWINGS

FIG. 3 depicts an example of one type of dynamic emulation in the FIG. 1 complex.

DETAILED DESCRIPTION

Figure 1:
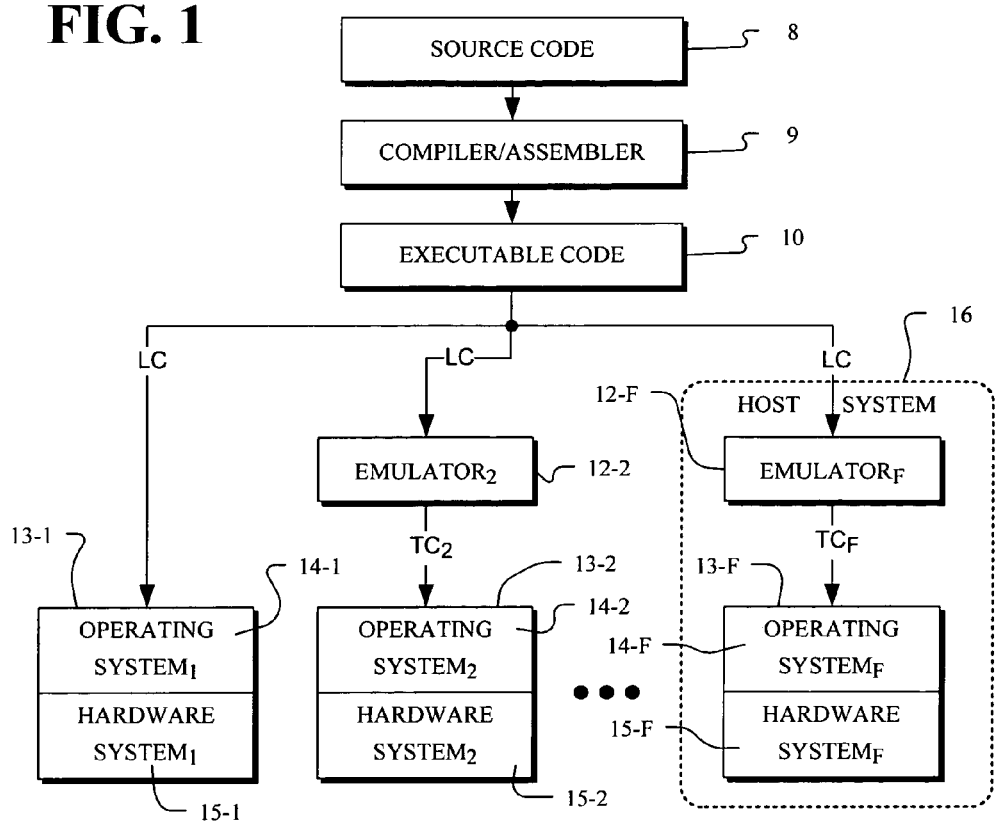
FIG. 1 depicts a block diagram of a complex of computer systems including a native computer system and a number of computer systems for emulating the native computer system.

In FIG. 1, a complex of computer systems 13, including computer systems 13-1, 13-2, . . . , 13-F, is presented where the target computer systems 13-2, . . . , 13-F use translated code for emulating the native computer system 13-1. The computer systems 13-1, 13-2, . . . , 13-F are shown in a complex, each receiving the same executable codes. Typically, each of the computer systems 13-1, 13-2, . . . , 13-F is a stand-alone system and not in the same complex. The computer systems 13-1, 13-2, . . . , 13-F are organized as having a operating systems 14-1, 14-2, . . . , 14-F, respectively, and having hardware systems 15-1, 15-2, . . . , 15-F, respectively. In FIG. 1, the host system 16, in a typical embodiment, is a stand-alone system which receives executable legacy code 10 as an input.

For the computer systems 13 of FIG. 1, source code 8, programmed in a convenient language, represents many application and other programs that collectively constitute a large investment in time and knowledge for owners of native computer systems. The native system 13-1 has available well-perfected compilers/assemblers 9 for forming native executable code 10 (legacy code) that efficiently executes application and other programs on the native system 13-1. For the computer systems 13-2, . . . , 13-F, however, well-perfected compilers/assemblers may not be available or, even if available, the source code 8 may not always be available. In order to help preserve the investment in the application and other programs of the native computer system, emulators are employed to execute the executable legacy code on one or more of the target computer systems 13-2, . . . , 13-F. Typically, the target computer systems 13-2, . . ., 13-F are new computer systems that have a different architecture. The objective is to preserve the investment in the application and other programs of the native architecture by enabling them to execute by emulation on the target computer systems.

In FIG. 1, the native executable code 10 is used directly in the computer system 13-1 according to the native architecture which includes a native operating system 14-1 and a native hardware system 15-1. Also, the native executable code 10 is processed by the emulator 12-2 to produce translated code, $TC_2$, for execution by the target system 13-2 according to an architecture different from the native architecture and which includes an operating system 14-2 and a hardware system 15-2. Similarly, the native executable code 10 is processed by the emulator 12-F to produce translated code, $TC_F$, for execution by the target system 13-F according to an architecture different from the native architecture and which includes an operating system 14-F and a hardware system 15-F.

Figure 2:
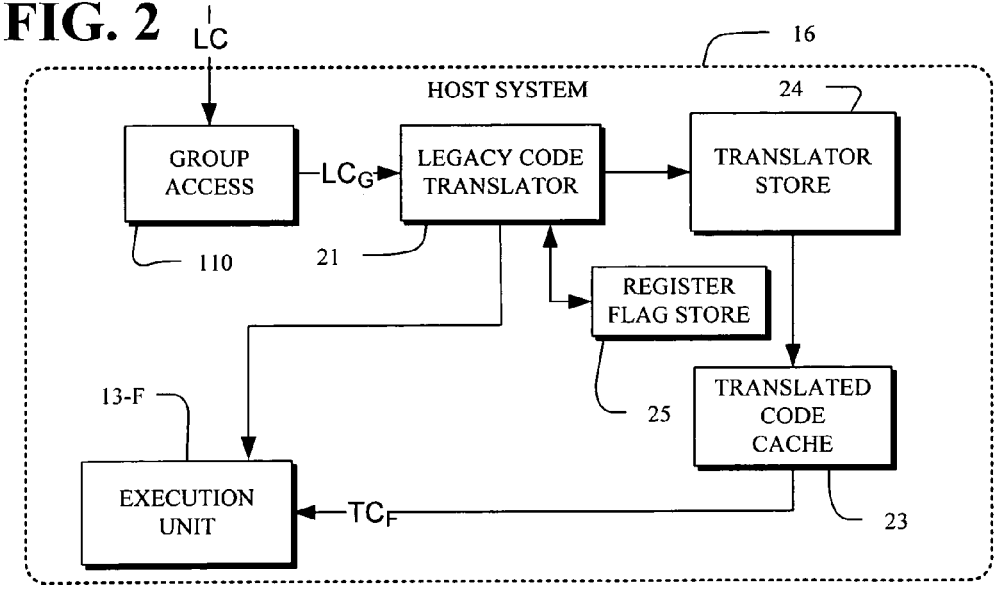
FIG. 2 depicts a block diagram of one emulator in the complex of FIG. 1 for emulating the native computer system of FIG. 1.

In FIG. 2, further details of the host system 16 of FIG. 1 are shown. The group access unit 110 accesses legacy code (LC) and presents the legacy code in groups ($LC_G$) to a legacy code translator 21. The legacy code translator 21 stores detailed information about the translation in translation store 24 and flags the loading of a precedent operand for use by a subsequent dependent instruction by setting a translation flag corresponding to that precedent operand in register flag store 25. The legacy code translator 21 also stores the executable blocks of host code in a translated code (TC) cache 23. The translated code ($TC_F$) output from the cache 23 is executed in execution unit 13-F.

A typical example of a known emulation is illustrated in FIG. 3. In this example, legacy code is being translated to translated code where the legacy code is complex instruction set code (CISC) for a CISC architecture computer system and the translated code is reduced instruction set code (RISC) for a RISC architecture computer system. In the FIG. 3 example, the legacy code is for the S/390 architecture. In the example, the code has been simplified for purposes of clarity of explanation. The same principles apply to translations from any given architecture to any other architecture.

In FIG. 3, a typical example of CISC legacy code consists of eight S/390 instructions (with hexadecimal instruction byte addresses 100, 102, 106, 10C, 110, 114, 118 and 11A) followed by 14 bytes of operand data (with hexadecimal byte addresses 120, 128, 12A) for a total of 44 bytes. The first step in the translation is to access the legacy code blocks. In the example, there are three 16-byte aligned blocks (a first block at addresses 100, 102, 106, 10C; a second block at addresses 110, 114, 118, 11A; and a third block at addresses 120, 128, 12A). Each CISC block is translated into a block of corresponding RISC code by translating each CISC instruction in a block in order. One or more RISC instructions are required to perform the equivalent function of each CISC instruction depending on the degree of complexity of each CISC instruction.

In the example of FIG. 3, the CISC instructions BALR, SRA, and AR each require only one RISC instruction, the CISC instructions AH and SH require three RISC instructions, and the CISC instructions LM and MVC require four RISC instructions. The third CISC block (with addresses 120, 128, 12A) consists solely of operand data and does not require translation. The blocks of RISC translated code emitted from the emulation are executed by the target computer system 13-2 of FIG. 1. A transfer routine is called at the end of each RISC block to locate the next block. At the end of the first block, XFER_SEQUENTIAL is called to look up the cache location of the RISC block corresponding to the next sequential CISC address (110 in the example). The second block ends in a branch (BC), and therefore calls XFER_TARGET to perform the analogous look-up function for the CISC branch target address.

The FIG. 3 example includes S/390 CISC instructions, including the LM instruction that uses fixed length operands which can be predictably translated without creating a byte alignment problem in the translated code. The FIG. 3 example also includes the MVC instruction that is unpredictable in its byte alignment since it uses variable length operands which cannot be predictably translated with respect to byte alignment in advance of execution of the precedent BALR instruction.

The FIG. 3 example represents instruction code of the type frequently occurring in CISC architectures for indirect addressing. The actual address used for the particular CISC instruction MVC is not determined until execution of the precedent operand-setting CISC instruction BALR. The precedent instruction BALR is executed before the operand-using dependent instruction MVC is executed. Translation of the MVC instruction presents the primitive size choice dilemma that frequently occurs in the translation of CISC code. The dilemma in FIG. 3 is whether in the translation to use short primitives (such as 1-byte primitives) or long primitives (such as 4-byte primitives) in the translation of MVC. Neither of these choices, however, results in efficient emulation.

In the FIG. 3 example, the second operand, DATA3, for the MVC fetch instruction is 4 bytes in length but is only aligned to a 2-byte boundary. If the target RISC architecture does not support unaligned references, then the LD4 primitive used in FIG. 3 to emulate the MVC fetch instruction will incur an alignment fault, and the costly overhead to process that alignment fault, during execution of the translated code. Although it might have been desirable in FIG. 3 to decompose the MVC fetch into two separate 2-byte aligned LD2 primitives, this decomposition is not done in the FIG. 3 example because the fetch address is a function of the contents of the base register B1. The value in the B1 register has not been determined at the time of translation in the FIG. 3 example because the operand-setting precedent BALR instruction which loads B1 for subsequent operand-using dependent instructions has not yet executed.

Figure 4:
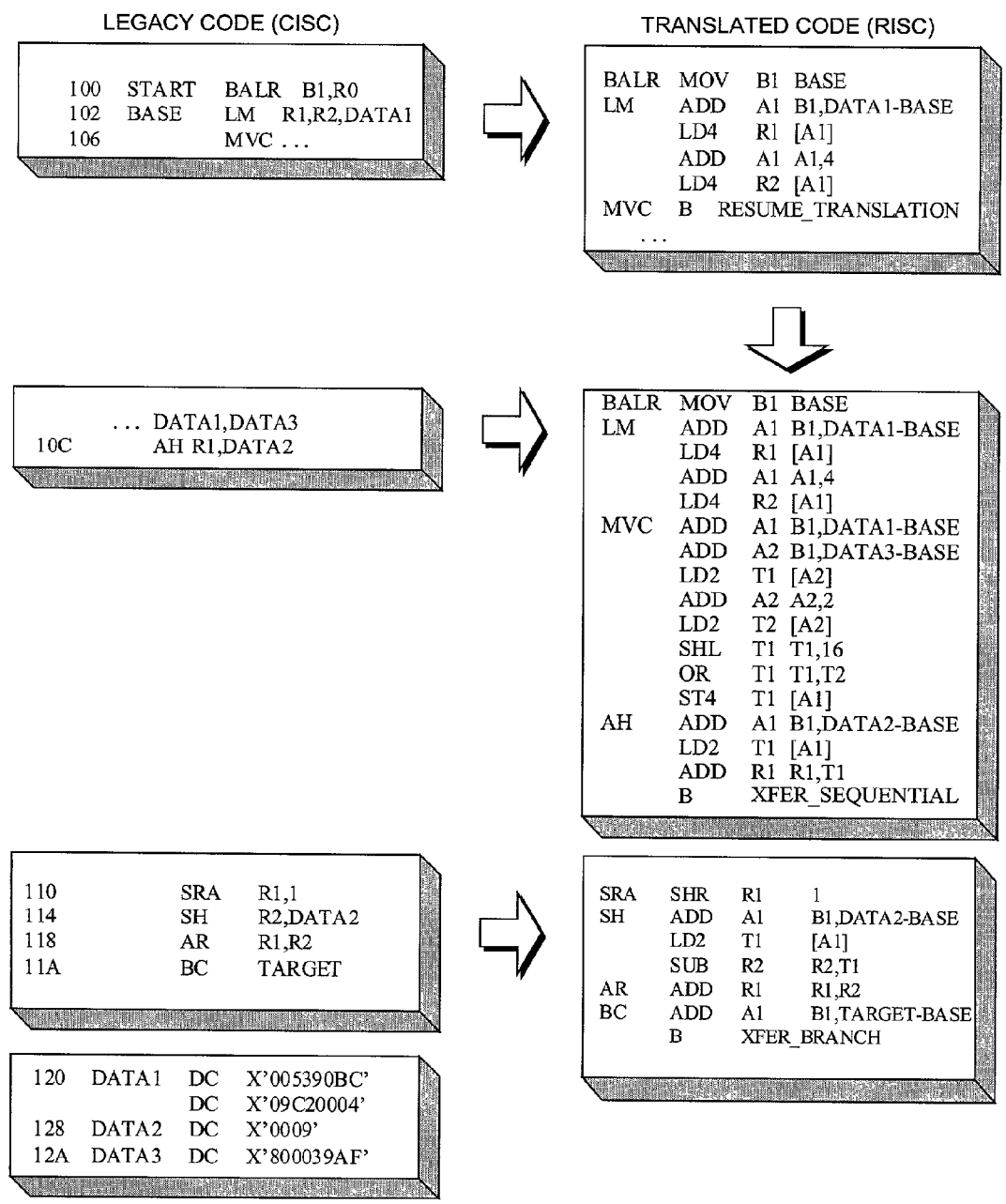
FIG. 4 depicts an example of improved dynamic emulation based upon memory address prediction.

In FIG. 4, an example of an embodiment of emulation is shown that, on a statistically significant basis, overcomes alignment faults and other execution phenomena in environments where instructions in RISC architectures have more limited capabilities than instructions in CISC architectures, particularly RISC instructions that have more limited alignment capabilities than the CISC instructions that they emulate.

In FIG. 4, the code example of FIG. 3 is modified to permit the code translation process to interact with the translated code execution process. The interaction reduces operand alignment problems and inefficiencies and as a result, improved and more efficient emulation is achieved. Specifically, the FIG. 4 example operates to execute translated operand-setting precedent instructions (such as BALR) that store operands in registers for use by subsequent operand-using dependent translated instructions (such as the translations of MVC). Each translation of a precedent CISC instruction, which has as its function the loading of a precedent operand for use by a subsequent dependent instruction, sets a translation flag corresponding to that precedent operand in register flag store 25. translation of subsequent translated instructions that depend on the precedent operand for efficient translation query the register flag store 25 to determine if the flag is set or not. If the flag is set, translation is suspended and execution is resumed until the precedent instruction is executed to produce the precedent operand and the untranslated dependent instruction is encountered. Thereafter all flags are cleared and translation of the dependent instruction and ensuing instruction stream continues.

In the example of FIG. 4, to record the dependency on register values of subsequent dependent instructions, a set of register-specific flags in flag store 25 are maintained by the translator 21 of FIG. 2. In operation all the flags are initialized to zero when translation begins. When an instruction (such as BALR) which modifies a particular register (such as the B1 register) is translated, then the flag for the particular register (B1 flag) is set in flag store 25. Subsequent instructions (such as LM, MVC) that use a particular register (the B1 register in this example) test the appropriate flag (B1) to determine whether a dependency exists. In the example of FIG. 4, the next instruction after the operand-setting precedent instruction BALR is LM and LM does indeed depend on B1. However, because LM operands are typically aligned so that the risk of an alignment fault is small, the LM instruction is a predictable precedent-using instruction that is automatically translated by translator 21 using the efficient LD4 primitives notwithstanding that the B1 flag is set. Because the LM instruction writes R1 and R2, the corresponding R1 and R2 flags are set in flag store 25.

The MVC instruction is next and is an operand-using instruction that also depends on B1. Because MVC operands are often unaligned, it is unwise to always use 4-byte aligned primitives automatically in translations of such instructions. Similarly, it is unwise always to use 1-byte primitives, the only ones guaranteed never to fault, because such uses result in translations that are less efficient statistically in most cases. Rather, because the MVC instruction is an unpredictable operand-using instruction, the FIG. 4 example temporarily suspends translation and saves the essential context of the translation. Instead of emitting the MVC translation after the BALR and LM translations have been emitted, translation of MVC is suspended and a RESUME_TRANSLATION call routine is emitted instead. Translation remains suspended while execution of the translated code (MOV) for the BALR instruction and execution of the translated code (ADD, LD4, ADD, LD4) for the LM instruction occur. After the LM instruction translated code execution, the execution stream reaches the RESUME_TRANSLATION call which operates to restore the translation context and resumes the translation at the MVC instruction (using the now known value of B1). The MVC translation is emitted based on the value of B1 loaded by the BALR instruction and overwrites the RESUME_TRANSLATION call that was emitted earlier at the time of suspending translation. In the translation, the current contents of B1 are used to calculate the value of the DATA1 and DATA3 memory addresses. These operations reveal that DATA1 is 4-byte aligned, but DATA3 is only 2-byte aligned. The translator 21 of FIG. 2 therefore emits the non-faulting LD2 sequence as shown for DATA3 while using the more efficient ST4 sequence for DATA1. In summary, the translated code for MVC uses the most efficient primitives (2-byte aligned and 4-byte aligned) which do not cause an alignment fault during execution of the translated code assuming, with high probability, that the value of B1 used is correct.

After translation of MVC, the translation in FIG. 4 then proceeds as in FIG. 3 commencing with the AH instruction.

In the FIG. 4 example, the possibility of a fault has not been entirely eliminated since the value of B1 used is the value determined for the current path through the code shown in FIG. 4. In the unlikely event that some other code were to load a different value in B1 and then branch directly to BASE, for example, a fault in the execution of the translated code of FIG. 4 could still occur. The FIG. 4 embodiment uses memory address prediction in that it predicts that the current value of B1 is likely to be the correct value of B1 even though, in general, the future value of an indirect memory address cannot always be guaranteed with certainty. The prediction is good in a vast majority of instances so that on a statistical basis efficient translation occurs. Similarly, for the LM instruction, the FIG. 4 embodiment statistically, with high reliability, predicts the byte alignment of the LM operands. The predictions of the types described used for each CISC instruction are stored in the translator 21 and are used as part of the translation process.

While the invention has been particularly shown and described with reference to preferred embodiments thereof it will be understood by those skilled in the art that various changes in form and details maybe made therein without departing from the scope of the invention.

The invention claimed is:

1. A computer-implemented method for dynamic emulation of legacy instructions comprising:
   accessing said legacy instructions,
   for each particular legacy instruction,
   translating the particular legacy instruction into one or more particular translated instructions for emulating the particular legacy instruction,
   if the particular legacy instruction is an operand-setting instruction for storing a value of a precedent operand, setting a corresponding flag when the value of the precedent operand has not been determined,
   if the particular legacy instruction is an operand-using instruction for using the precedent operand, checking to determine if the corresponding flag is set,
   if the corresponding flag is set, suspending the translation of said operand-using instruction,
   executing said one or more particular translated instructions corresponding to said operand-setting instruction to determine the value of said precedent operand,
   clearing the corresponding flag and resuming translation of said legacy instructions using the value of said precedent operand in the resumed translation,
   if the corresponding flag is not set, continuing the translation of said operand-using instruction,
   continuing executing the translated instructions to emulate execution of the legacy instructions.

2. The method of claim 1 wherein said step of suspending the translation inserts a resume_translation call into a stream of said translated instructions in place of translations of said operand-using instruction.

3. The method of claim 2 wherein said step of executing said one or more particular translated instructions continues until said resume_translation call is reached and said step of resuming translation resumes by translating said operand-using instruction.

4. The method of claim 1 wherein said particular legacy instruction is an unpredictable operand-using instruction having unpredictable byte alignment of operands.

5. The method of claim 4 wherein said unpredictable operand-using instruction uses operands of variable length.

6. The method of claim 1 wherein if said if the particular legacy instruction is a predictable operand-using instruction, said step of checking is bypassed to said step of continuing the translation.

7. The method of claim 6 wherein said predictable operand-using instruction employs fixed-length operands.

8. The method of claim 1 wherein said legacy instructions are for a legacy system having a S/390 architecture.

9. The method of claim 1 wherein said legacy instructions are object code instructions compiled/assembled for a legacy architecture.

10. The method of claim 1 wherein said translated instructions are for execution in a RISC architecture.

11. A computer-implemented method for dynamic emulation of legacy instructions, where the legacy instructions are compiled/assembled into object code form for a native architecture, where the legacy instructions are executed as guests in the host architecture, where the legacy instructions are translated to translated instructions in the host architecture and the translated instructions are executed in the host architecture concurrently with the translation of the legacy instructions in the host architecture, comprising:

accessing said legacy instructions in a host system operating with said host architecture, for each particular legacy instruction, translating the particular legacy instruction into one or more particular translated instructions of the host system for emulating the particular legacy instruction as a guest in said host architecture, if the particular legacy instruction is an operand-setting instruction for storing a value of a precedent operand at execution time of said one or more particular translated instructions, setting a corresponding flag in a flag store of said host system indicating that the value of the precedent operand has not been determined, if the particular legacy instruction is an operand-using instruction for using the precedent operand, checking said flag store in said host system to determine if the corresponding flag is set in said flag store, if the corresponding flag is set in said flag store, suspending the translation in said host system of said operand-using instruction, executing in said host system said one or more particular translated instructions corresponding to said operand-setting instruction to determine the value of said precedent operand, initializing all flags to zero in said flag store and resuming translation of said legacy instructions in said host system using the value of said precedent operand in the resumed translation, if the corresponding flag in said flag store is not set, continuing the translation of said operand-using instruction in said host system, continuing executing the translated instructions to emulate execution of the legacy instructions.

12. A computer system for dynamic emulation of legacy instructions comprising:

an access unit for accessing said legacy instructions, a flag store for storing flags to indicate when the values of precedent operands have not been determined, an execution unit for executing translated instructions to emulate execution of the legacy instructions a legacy code translator operating for each particular legacy instruction, to translate the particular legacy instruction into one or more particular translated instructions for emulating the particular legacy instruction, if the particular legacy instruction is an operand-setting instruction for storing a value of a precedent operand, to set a corresponding flag in said flag store when the value of the precedent operand has not been determined, if the particular legacy instruction is an operand-using instruction for using the precedent operand, to check said flag store to determine if the corresponding flag is set, if the corresponding flag is set in said flag store, to suspend the translation of said operand-using instruction, and to execute said one or more particular translated instructions corresponding to said operand-setting instruction to determine the value of said precedent operand, to initialize all flags to zero in said flag store and resume translation of said legacy instructions using the value of said precedent operand in the resumed translation, if the corresponding flag is not set, to continue the translation of said operand-using instruction.

13. The system of claim 12 wherein said legacy code translator in suspending the translation inserts a resume-_translation call into a stream of said translated instructions in place of translations of said operand-using instruction.

14. The system of claim 13 wherein said legacy code translator in executing said one or more particular translated instructions continues until said resume_translation call is reached and resumes translation by translating said operand-using instruction.

15. The system of claim 12 wherein said particular legacy instruction is an unpredictable operand-using instruction having unpredictable byte alignment of operands.

16. The system of claim 15 wherein said unpredictable operand-using instruction uses operands of variable length.

17. The system of claim 12 wherein if said if the particular legacy instruction is a predictable operand-using instruction, said legacy code translator operates to bypass the checking of said flag store and continues the translation of said legacy instructions.

18. The system of claim 17 wherein said predictable operand-using instruction employs fixed-length operands.

19. The system of claim 12 wherein said legacy instructions are for a legacy system having a S/390 architecture.

20. The system of claim 12 wherein said legacy instructions are object code instructions compiled/assembled for a legacy architecture.

21. The system of claim 12 wherein said translated instructions are for execution in a RISC architecture.

* * * * *